United States Patent [19]

Katori et al.

[11] Patent Number: 4,984,190
[45] Date of Patent: Jan. 8, 1991

[54] SERIAL DATA TRANSFER SYSTEM

[75] Inventors: Shigetatsu Katori; Yukio Maehashi; Yukari Misawa, all of Tokyo, Japan

[73] Assignee: NEC Corporation, Tokyo, Japan

[21] Appl. No.: 569,539

[22] Filed: Aug. 20, 1990

Related U.S. Application Data

[63] Continuation of Ser. No. 426,487, Oct. 23, 1989, abandoned, which is a continuation of Ser. No. 91,801, Sep. 1, 1987, abandoned.

[30] Foreign Application Priority Data

Sep. 1, 1986 [JP] Japan .................................. 61-206404
Sep. 10, 1986 [JP] Japan .................................. 61-214432

[51] Int. Cl.$^5$ ............................................ G06F 13/00
[52] U.S. Cl. .................................. 364/900; 364/932.8; 364/942.4; 364/942.3; 364/950; 364/950.3
[58] Field of Search ............................... 364/200, 900

[56] References Cited

U.S. PATENT DOCUMENTS 4,689,740  8/1987  Moelands et al. .................. 364/200

Primary Examiner—Dale M. Shaw
Assistant Examiner—Michael A. Jaffe
Attorney, Agent, or Firm—Foley & Lardner, Schwartz, Jeffery, Schwaab, Mack, Blumenthal & Evans

[57] ABSTRACT

Herein disclosed is a serial data transfer system which has first and second serial data processors connected via a single data line and a single clock line for transferring serial data therebetween. Each of the first and second serial data processors includes: reception confirmation signal output means for outputting a reception confirmation signal to the data line; and reception confirmation signal detection means for detecting the reception confirmation signal on the data line. The confirmation of the data transfer is executed in synchronism with serial clock pulses outputted to the clock line. Alternatively, the first or second serial data processor includes: an output circuit for outputting a reception confirmation signal to the data line; a circuit for generating a first signal indicating the end of reception of the serial data; a circuit for generating a second signal indicating the end of processing of the data received; and a circuit for controlling the output of said reception confirmation signal. When the reception of the serial data on the data line is ended, the output circuit outputs the reception confirmation signal to the data line in synchronism with the first or second signal.

17 Claims, 11 Drawing Sheets 104, 134—ACK DETECTOR
114, 144—ACK OUTPUT CIRCUIT
116, 146—ACK OUTPUT SELECTION FLAG 125, 155 ····· SERIAL CLOCK COUNTER

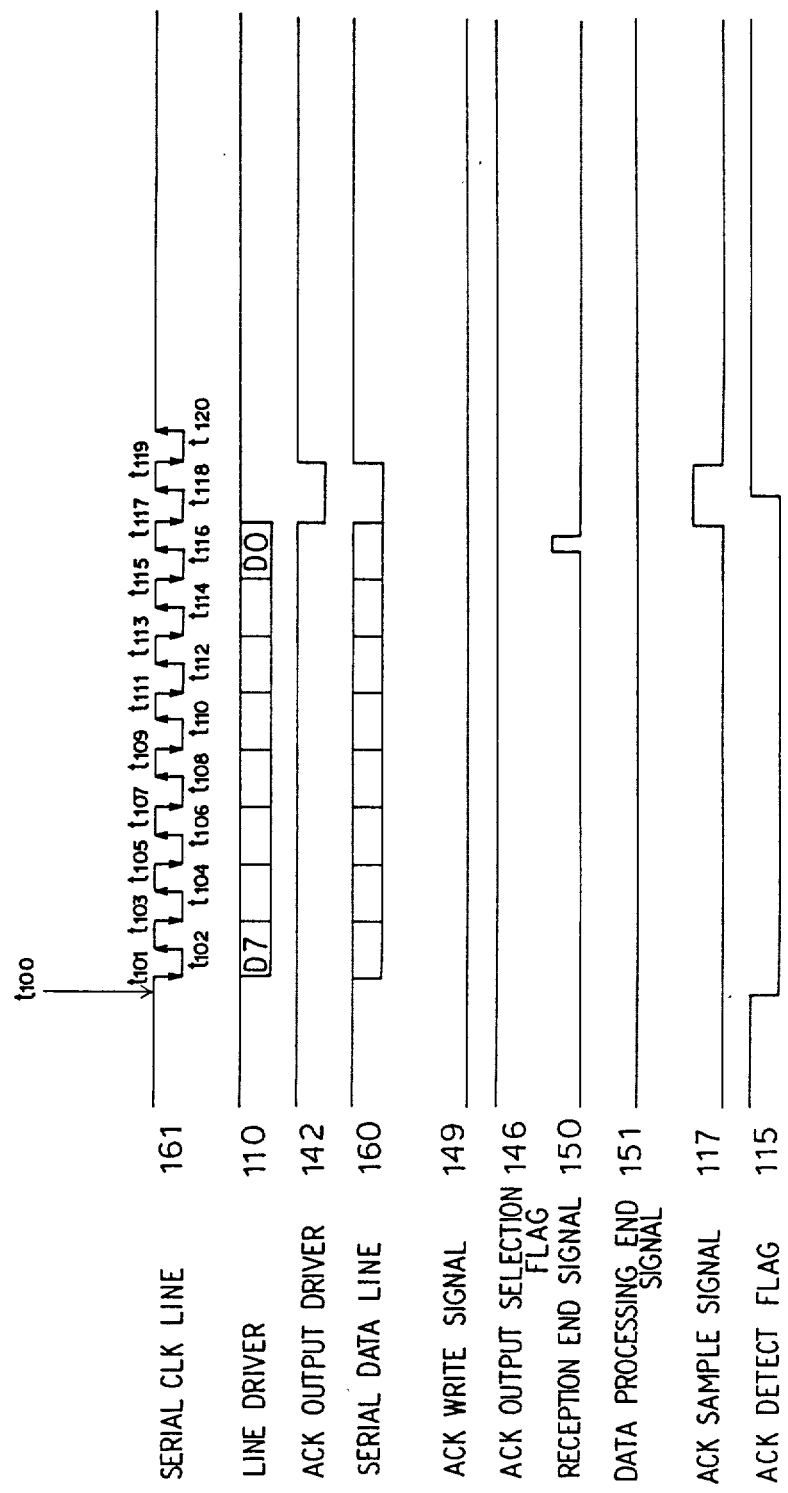

SERIAL DATA TRANSFER SYSTEM

This application is a continuation of application Ser. No. 07/426,487, filed Oct. 23, 1989, now abandoned, which is a continuation of application Ser. No. 07/091,801, filed Sept. 1, 1987, now abandoned.

BACKGROUND OF THE INVENTION

1. Field of the Invention

The present invention relates to a serial data transfer system having a plurality of semiconductor chips for serially sending and receiving data between the chips in synchronism with a single serial clock pulse and, more particularly, to a serial data transfer system using a single clock line and a single data line for sending and receiving serial data in synchronism with the serial clock pulse while confirming the data reception.

2. Description of the Prior Art

There are two methods for transferring data between a plurality of semiconductor chips (which will be shortly referred to as the "LSI chips"): one using data buses of eight or sixteen bits; and the other using a single data line in a time sharing manner to transfer the data in series bit by bit. The latter method is remarkably convenient for connecting the LSI chips because only two lines are required for these connections: a data line and a clock line.

However, it cannot be said that the serial data transfer system can complete the serial transfer merely through the two signal lines or the serial clock and data lines. In order to ensure the serial transfer through one data line, more specifically, it is necessary not only that the start and end of the transfer should be able to be correctly detected but also that it should be confirmed whether or not the data sent from the transmitting side have been correctly received by the receiving side. For this confirmation, another signal line should have been used in the prior art. This means that the serial transfer could not be executed merely by the two signal lines of the serial clock and data lines.

In another aspect, the second serial data processor of the serial data transfer system specified above does not send any reception confirmation signal to the first serial data processor after it has received the serial data of eight bits (or one byte). The prior art fails to provide any means for informing the transmitting side of a rejection to the reception of continuous serial data of plural bytes being transferred, even in case the reception is desired because of some malfunction occurring at the receiving side. In order to eliminate this difficulty, the receiving side has to be programmed to output the reception confirmation signal to the transmitting side if it ends the processing of the data received. According to this method, however, the receiving side has also to be programmed to generate the reception confirmation signal each time it receives one byte. This raises a serious defect that the processing efficiency of the CPU used is seriously deteriorated.

SUMMARY OF THE INVENTION

It is, therefore, an object of the present invention to provide an improved serial data transfer system which can transfer and confirm serial data through only two signal lines, i.e., serial clock and data lines.

Another object of the present invention is to provide an improved serial data transfer system which is enabled to generate serial clock pulses at a high rate thereby to maximize the transfer efficiency of the serial data by generating a reception confirmation signal at an arbitrary timing and to realize confirmation signal output and detection circuits with a small amount of hardware.

Still another object of the present invention is to provide an improved serial data transfer system which is enabled to inform the transmitting side of a rejection to the reception of the reception confirmation signal when a malfunction occurs at the receiving side by prohibiting the reception confirmation signal from being sent out for a predetermined period to the transmitting side.

A further object of the present invention is to provide an improved serial data transfer system which can drastically improve the processing efficiency of a CPU inclusive.

According to one feature of the present invention, there is provided a serial data transfer system comprising: a first serial data processor acting as a master; a second serial data processor acting as a slave; a data line connecting the first and second serial data processors for allowing serial data to be transferred therethrough between the first and second serial data processors; and a clock line connecting the first and second serial data processors, wherein the improvement resides in that each of the first and second serial data processors includes: reception confirmation signal output unit for outputting a reception confirmation signal to the data line; and reception confirmation signal detection unit for detecting the reception confirmation signal on the data line; and in that the confirmation of the data transfer is executed in synchronism with serial clock pulses outputted to the clock line.

According to another feature of the present invention, there is provided a serial data transfer system comprising: first and second serial data processors; a data line connecting the first and second serial data processors for allowing serial data to be transferred therethrough between the first and second serial data processors; and a clock line connecting the first and second serial data processors, wherein the improvement resides in that each of the first and second serial data processors includes: an output circuit for outputting a reception confirmation signal to the data line; a circuit for generating a first signal indicating the end of reception of the serial data; a circuit for generating a second signal indicating the end of processing of the data received; and a circuit for controlling the output of the reception confirmation signal; and in that, when the reception of the serial data on the data line is ended, the output circuit outputs the reception confirmation signal to the data line in synchronism with the first signal or the second signal.

BRIEF DESCRIPTION OF THE DRAWINGS

Other objects, advantages and features of the present invention will become apparent from the following description to be made with reference to the accompanying drawings, in which:

FIGS. 8A and 8B are also timing charts but show the data transfers when an ACK selection flag is at "1" and "0", respectively.

DESCRIPTION OF THE PREFERRED EMBODIMENTS

Figure 1:
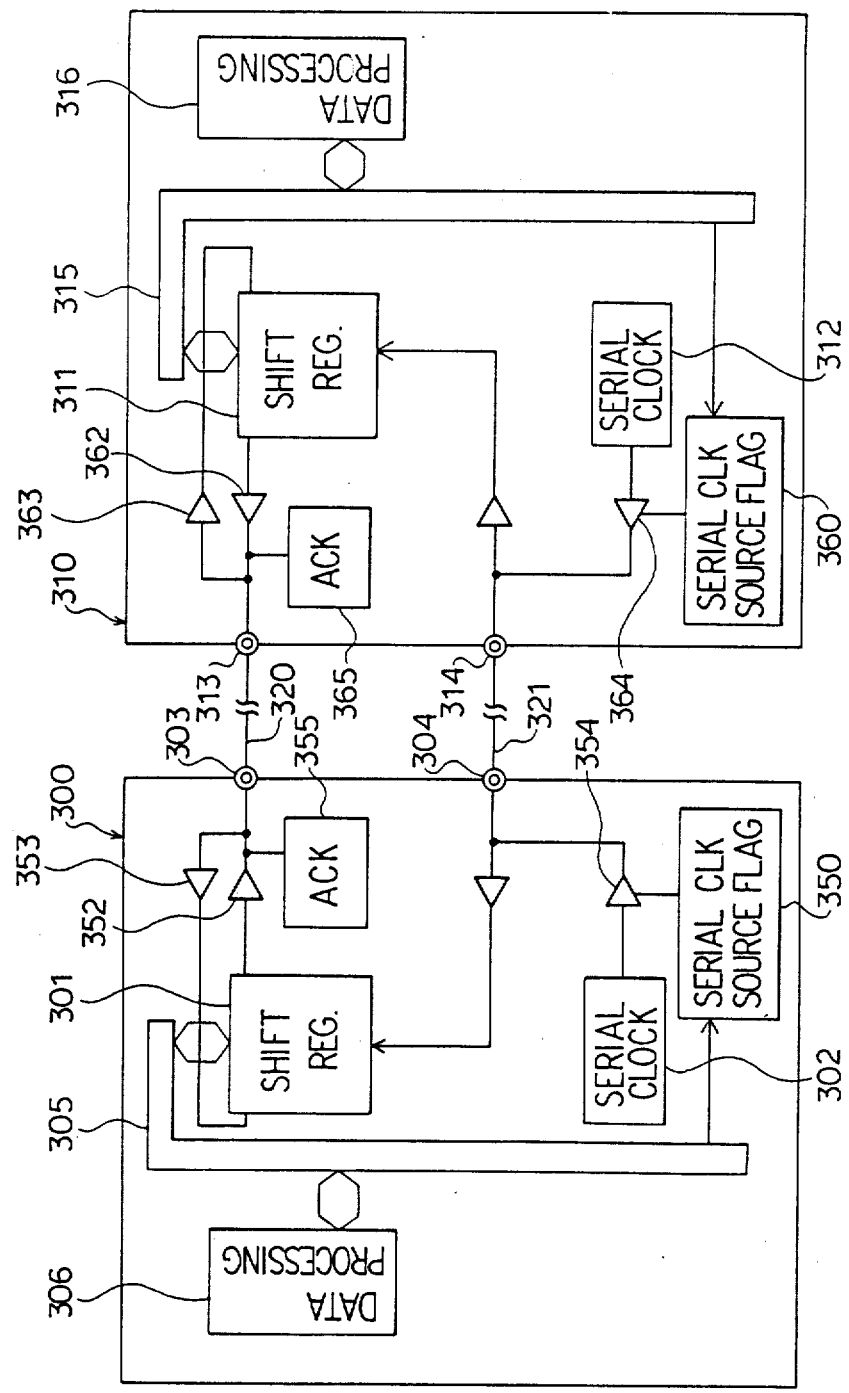
FIG. 1 is a block diagram showing a serial data transfer system according to a first embodiment of the present invention.

FIG. 1 is a block diagram showing the serial data transfer system according to one embodiment of the present invention. Incidentally, in this serial data transfer system, a plurality of slaves can be connected with one master. For simplicity of description, herein will be described a serial data transfer between one master and one slave.

A first serial data processor (i.e., a master) 300 is composed of a shift register 301, a serial clock generator 302, a serial data terminal 303, a serial clock terminal 304, a data processing unit 306, a serial clock source flag 350 and an ACK control 355. The shift register 301, the data processing unit 306 and the serial clock source flag 350 are mutually connected via an internal data bus 305 of plural bits. The data processing unit 306 is made operative to read in and write out send and receive data and to set and reset (or clear) the serial clock source flag 350. The shift register 301 has its output terminal connected with the serial data terminal 303 through an output line driver 352 for driving a serial data line 320.

The external serial data line 320 in turn is connected with the serial data terminal 303. This serial data terminal 303 is connected with the input terminal of the shift register 301 through an input line buffer 353. With this construction thus made, the serial data can be sent and received.

The serial clock generator 302 is made operative to generate serial clock pulses and is connected with the serial clock terminal 304 through a clock driver 354. The serial clock source flag 350 is one for selecting the serial clock source. If this serial source flag 350 is set, the serial data processor 300 it belongs to is the source of serial clock pulses, i.e., the master. This master then controls the clock driver 354 to output the serial clock pulses of the serial clock generator 302 from the serial clock terminal 304. If the serial clock source flag 350 is cleared or reset, on the contrary, its serial data processor 300 is the slave for sending and receiving the serial clock pulses coming from the other processor. In this embodiment, one processor 300 is used as the master whereas the other processor 310 is used as the slave. The master and slave may have the identical circuitry, as shown. The serial clock pulses either selected under the control of the serial clock source flag 350 or inputted from the outside are used for the shift register 301.

The ACK control 355 added according to the present invention has functions to confirm that a reception confirmation signal has been outputted to the serial data line 320 and to output the reception confirmation signal by driving the serial data line 320 to a low (or L) level.

The second serial data processor (acting as the slave) 310 has a construction identical to that of the first serial data processor 300 and is composed of a shift register 311, a serial clock generator 312, a serial data terminal 313, a serial clock terminal 314, a data processing unit 316, a serial clock source flag 360 and an ACK control 365.

The shift register 311, the data processing unit 316 and the serial clock source flag 360 are mutually connected via an internal data bus 315. The data processing unit 316 has functions to read out and write in the send and receive data with the shift register 311 via that internal data bus 315 and to set and clear the serial clock source flag 360. The shift register 311 has its output terminal connected with the serial data terminal 313 through a line driver 362 for driving the serial data line 320. The serial data terminal 313 is connected directly with the serial data line 320.

The serial data terminal 313 is further connected with the input terminal of the shift register 311 through a line buffer 363. If the serial clock source flag 360 is cleared, the serial data processor 310 it belongs to acts as the slave. In this state, this slave 310 sends and receives the serial clock pulses coming from the master 300.

Like the ACK control 355 of the master 300, the ACK control 365 is given the functions to output the reception confirmation signal to the serial data line 320 and to detect the reception confirmation signal (at the L level) inputted thereto via the serial data line 320.

The first serial data processor 300 has its serial data terminal 303 and serial clock terminal 304 connected with the serial data terminal 313 and serial clock terminal 314 of the second serial data processor 310, respectively, via the single serial data line 320 and a single serial clock line 321.

Figure 2:
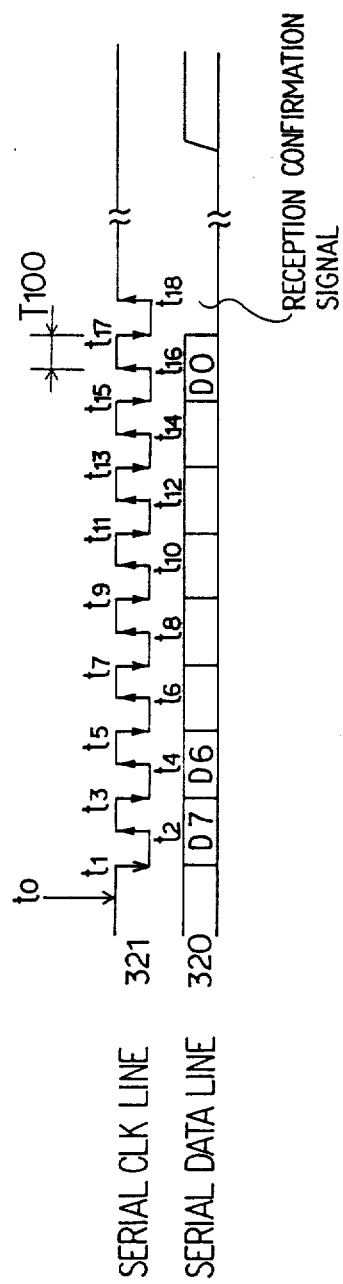
FIG. 2 is a timing chart showing a serial data transfer to be accomplished by the serial data transfer system of FIG. 1.

Turning now to FIG. 2, the synchronizations between the serial data and the serial clock pulses will be described in the following, in case data of eight bits are to be continuously transferred from the first serial data processor 300 to the second serial data processor 310. Since, in this case, the first serial data processor 300 is the master, its serial clock source flag 350 is set in advance by the program. Since, on the other hand, the second serial data processor 310 is the slave, its serial clock source flag 360 is cleared in advance by the program.

The serial clock line 321 is set at a high level while no data is being transferred. The data processing unit 306 transfers the send data at a timing $t_0$ to the shift register 301 via the internal data bus 305. The serial clock generator 302 starts generation of the serial clock pulses at a subsequent timing $t_1$ and sends out the clock pulses to the serial clock line 321. On the other hand, the shift register 301 shifts one bit in synchronism with the breaking edge $t_1$ of the serial clock pulse of the serial clock generator 302. The shift register 301 uninterruptedly repeats its shifting actions sequentially in synchronism with the individual timings of breaking edges $t_3$, $t_5$, $t_7$, $t_9$, $t_{11}$, $t_{13}$ and $t_{15}$ of the serial clock pulses and sends the one bit at its last stage sequentially to the serial data line 320.

The second serial data processor 310 at the receiving side shifts and inputs the serial data of one bit on the serial data line 320, in synchronism with a rising edge $t_2$ of the serial clock pulse which is inputted from the serial clock line 321 through the serial clock terminal 314, to the shift register 311 through the serial data terminal 313. The serial receiver 310 uninterruptedly shifts and inputs the serial data on the serial data line 320 to the shift register 311 sequentially in synchronism with rising edges $t_4$, $t_6$, $t_8$, $t_{10}$, $t_{12}$, $t_{14}$ and $t_{16}$ of the serial clock pulses.

When the reception of the serial data of eight bits is ended at the final timing $t_{16}$, the data processing unit 316 reads out the content of the shift register 311 via the internal data bus 315 and is prepared for necessary data processings.

In synchronism with the timing of the breaking edge $t_{17}$ of the subsequent serial clock pulse, the ACK control 365 outputs a signal at the low level to the serial data line 320 and issues it as the reception confirmation signal to the first serial data processor 300.

The ACK control 355 of the first serial data processor 300 at the transmitting side samples the serial data line 320 at a timing $t_{18}$ of the breaking edge of the subsequent serial clock pulse to confirm the low-level signal or the reception confirmation signal coming from the second serial data processor 310 thereby to confirm the end of the serial data transfer of one byte.

As has been described above, the reception confirmation can be conducted through the single data line by returning the confirmation signal in synchronism with the break of the clock pulse, after the second serial data processor 310 at the receiving side has received the serial data, and by latching the returned confirmation signal in the transmitting side at the rising edge of the subsequent clock pulse.

Incidentally, it is necessary according to this embodiment to output the confirmation signal for a half clock period (i.e., T100) extending from the timing $t_{16}$ at which the final data bit is received to the subsequent timing $t_{17}$. In case the period of the serial clock pulses is sufficiently long whereas the transfer rate of the serial data is sufficiently low, the data processing unit 316 can sufficiently process the data for that half period T100 so as to confirm the reception. However, as the period of the serial clock pulses becomes insufficient whereas the transfer rate of the serial data increases, the judgement of whether or not the reception confirmation signal should be outputted cannot be completed within that half period T100. This raises a problem that the rate of the serial clock pulses cannot be increased (that is to say, the data cannot be transferred at a higher baud rate). Especially in case the serial data line 320 and the serial clock line 321 are connected with a number of serial data processors in addition to the first and second serial data processors 300 and 310, the period of the serial clock pulses, i.e., the transfer rate of the serial data is determined in conformity with the serial data processor having the least data processing ability for the reception confirmation at the receiving side. As a result, for the serial data processor which should be able to transfer the serial data at a high rate, the optimum short-period serial clock pulses cannot be used to drop the efficiency of the serial data transfer.

A second embodiment of the present invention having succeeded in solving those problems will be described with reference to FIG. 3.

Figure 3:
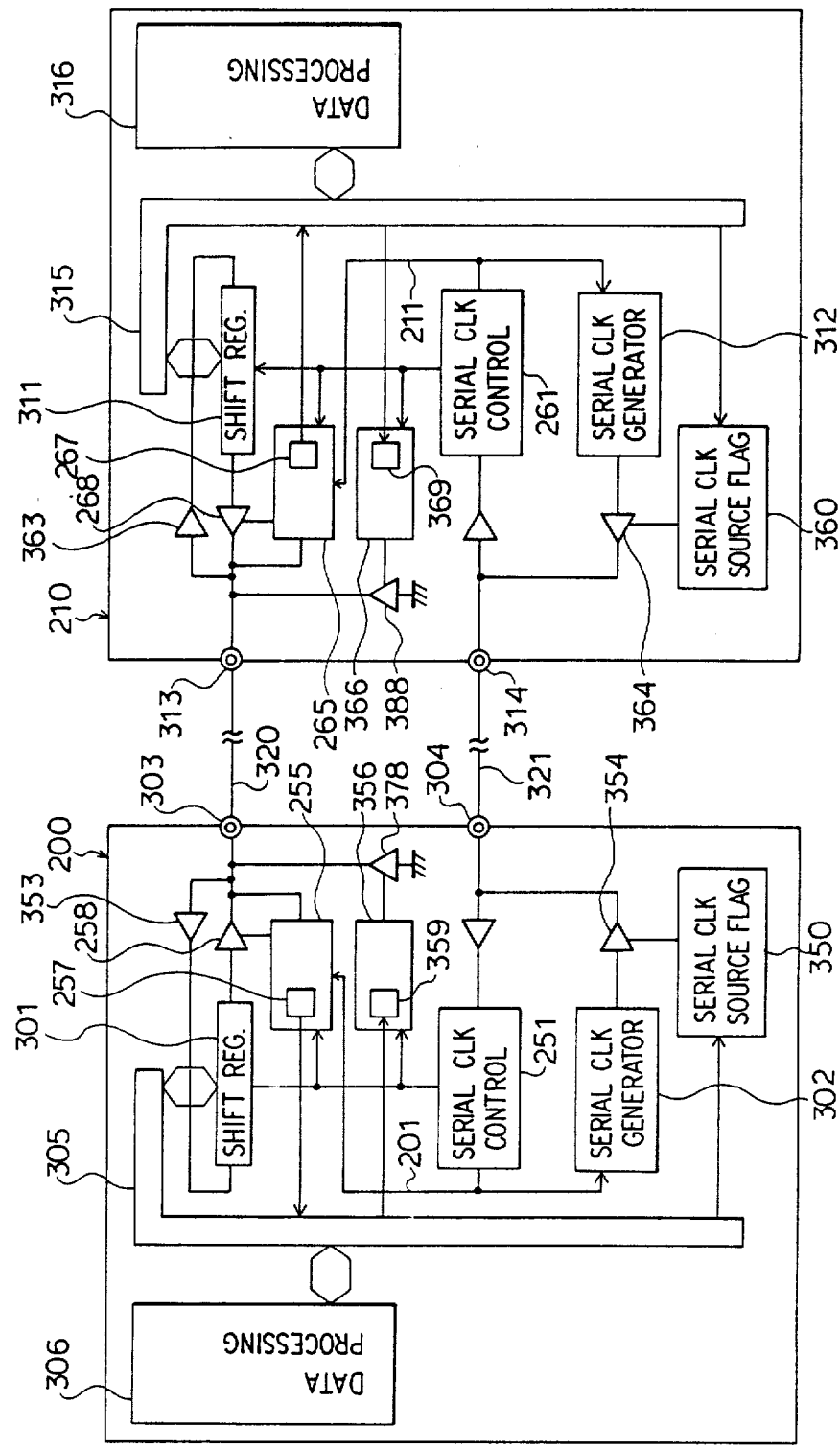
FIG. 3 is also a block diagram but shows a serial data transfer system according to a second embodiment of the present invention.

As shown in FIG. 3, a first serial data processor 200 is composed of the shift register 301, the serial clock generator 302, the serial data terminal 303, the serial clock terminal 304, the internal data bus 305, the data processing unit 306, the input line buffer 353, an output line driver 258, the serial clock source flag 350, a serial clock control 251, an ACK detector 255, an ACK detection flag 257, the clock driver 354, and ACK output circuit 356, an ACK trigger flag 359, and an ACK output driver 378.

Of these components, the shift register 301, the serial clock generator 302, the serial data terminal 303, the serial clock terminal 304, the internal data bus 305, the data processing unit 306, the line buffer 353 and the serial clock source flag 350 have the same functions as those of the first serial data processor 300 shown in FIG. 1, and their detailed description will be omitted.

The serial clock control 251 outputs an ACK sampling signal 201 to the ACK detector 255. The serial clock control 251 activates that ACK sampling signal 201, after it has received data of a predetermined length, to designate the ACK detector 255 for the sampling period of the reception confirmation signal.

The ACK output circuit 356 includes the ACK trigger flag 359. If this trigger flag 359 is written with the logic "1" via the internal data bus 305 under the control of the data processing unit 306, the reception confirmation signal (at the L level) is outputted to the serial data line 320, and the ACK trigger flag 359 itself is cleared again in synchronism with the output of the reception confirmation signal. The ACK output driver 378 is one for driving the serial data line 320 to the L level and is controlled by the ACK trigger flag 359. On the other hand, the ACK detector 255 includes the ACK detection flag 257. If it is confirmed under the control of the ACK sampling signal 201 that the reception confirmation signal has been outputted to the serial data line 320, the ACK detection flag 257 is set. This flag 257 is cleared in synchronism with the start of the serial sending action. On the other hand, the content of this ACK detection flag 257 can be read out via the internal data bus 305. The line driver 258 is one for driving the serial data line 320 and is controlled by the ACK detector 255.

A second serial data processor 210 has a construction identical to that of the first serial data processor 200 and is composed of the shift register 311, the serial clock generator 312, the serial data terminal 313, the serial clock terminal 314, the internal data bus 315, the data processing unit 316, the line buffer 363, a line driver 268, the serial clock source flag 360, a serial clock control 261, an ACK detector 265, and ACK detection flag 267, a clock driver 364, an ACK output circuit 366, an ACK trigger flag 369 and an ACK output driver 388.

Of these components, the shift register 311, the serial clock generator 312, the serial data terminal 313, the serial clock terminal 314, the internal data bus 315, the data processing unit 316, the line buffer 363 and the serial clock source flag 360 have the functions identical to those of the corresponding components of the processors 300 and 200 shown in FIGS. 1 and 3, and their detailed descriptions will be omitted.

The serial clock control 261 activates an ACK sampling signal 211, after it has received data of a predetermined length, and designates the ACK detector 265 for a sampling period of the reception confirmation signal. The ACK output circuit 366 includes the ACK trigger flag 369. If this trigger flag 369 is written with the logic "1" via the internal data bus 315 under the control of the data processing unit 316, the reception confirmation signal (at the L level) is outputted to the serial data line 320, and the ACK trigger flag 369 itself is cleared again in synchronism with the output of the reception confirmation signal. The ACK output driver 388 is one for driving the serial data line 320 to the L level and is controlled by the ACK trigger flag 369. The ACK detector 265 includes the ACK detection flag 267 and is set, if it is confirmed under the control of the ACK sampling signal 211 that the reception confirmation signal has been outputted to the serial data line 320, and cleared in synchronism with the start of the serial sending action. On the other hand, the content of this ACK detection flag 267 can be read out via the internal data bus 315. The line driver 268 is one for driving the serial data line 320 and is controlled by the ACK detector 265. Incidentally, if both the ACK output drivers 378 and 388 are OFF, the serial data line 320 is set at the high level by the line drivers 258 and 268.

Figure 4A:
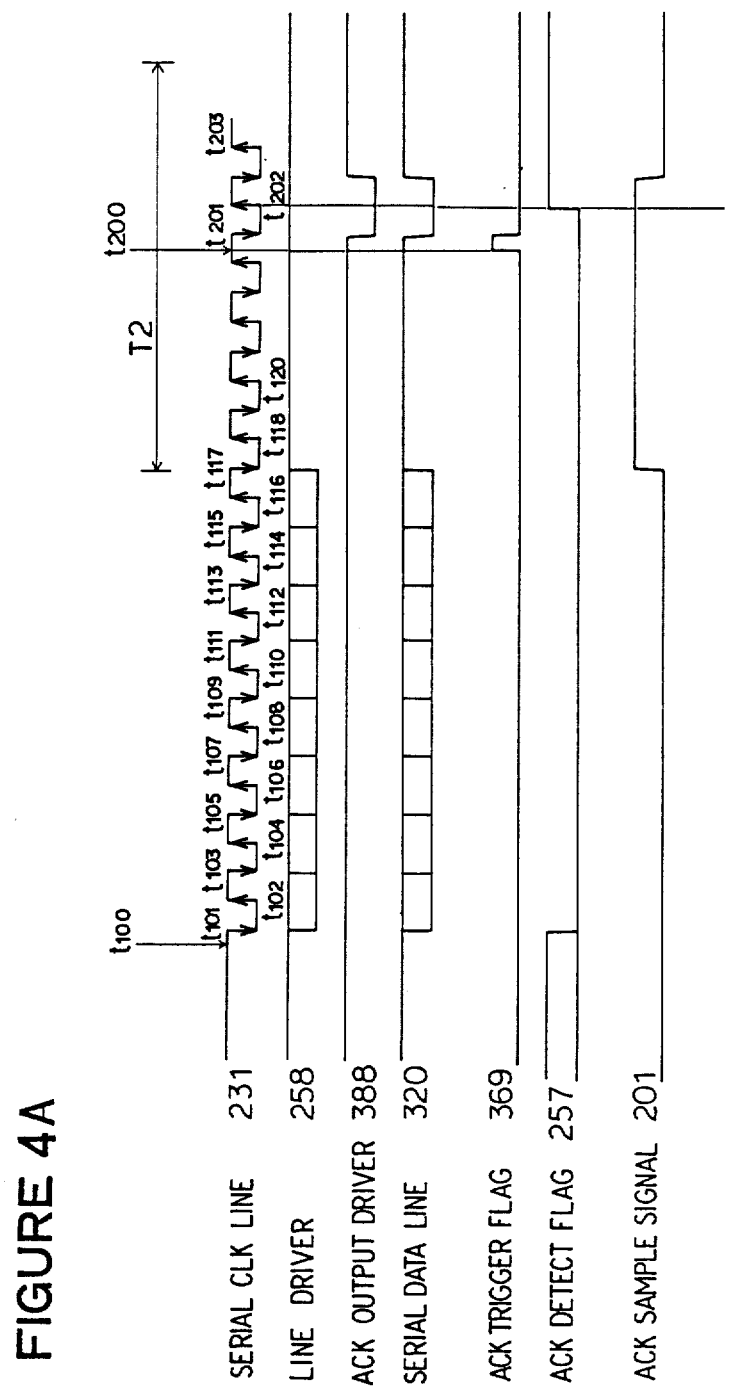
FIGS. 4A and 4B are also timing charts but show data transfers to be accomplished by the serial data transfer system of FIG. 3.

With reference to FIG. 4A, the synchronizations between the serial data on the serial data line 320 and the serial clock pulses on a serial clock line 321 will be described in the following in case data of eight bits are to be continuously transferred from the first serial data processor 200 to the second serial data processor 210. The first serial data processor 200 has its serial clock source flag 350 set in advance by the program so that it acts as the source (or the master) of serial clock pulses. On the contrary, the second serial data processor 210 has its serial clock source flag 360 cleared in advance by the program so that it is fed (as the slave) with the serial clock pulses from the serial clock terminal 314. The serial clock line 321 is held at the high level while no data is being transferred.

If the data processing unit 306 transfers the send data at a timing $t_{100}$ to the shift register 301 via the internal data bus 305, the ACK detection flag 257 is cleared at the timing $t_{100}$, and the serial clock generator 302 starts generation of the serial clock pulses at a subsequent timing $t_{101}$ to send them out to the serial clock line 321. In synchronism with the breaking edge $t_{101}$ of the serial clock pulse generated by the serial clock control 251, on the other hand, the shift register 301 shifts one bit and outputs the data of one bit at its final stage to the serial data line 320 through the line driver 258 and the serial data terminal 303. The shift register 301 uninterruptedly repeats its shifting actions sequentially in synchronism with the individual timings of breaking edges $t_{103}$, $t_{105}$, $t_{107}$, $t_{109}$, $t_{111}$, $t_{113}$ and $t_{115}$ of the serial clock pulses and sends out the one bit at its final stage to the serial data line 320. When the serial data of eight bits have been completely sent out in synchronism with the timing $t_{115}$, the ACK control 255 pulls up the line driver 258 in synchronism with the timing of a breaking edge $t_{117}$ of the subsequent serial clock pulse. This raises the potential of the serial data line 320 into the high level.

The serial clock control 251 of the first serial data processor 200 activates the ACK sampling signal 201 in synchronism with the timing $t_{117}$. The serial clock control 251 uninterruptedly outputs the serial clock pulses, and the ACK detector 255 starts sensing the L-level signal, which is outputted as the reception confirmation signal from the second serial data processor 210 to the serial data line 320, in synchronism with each timing of rising edges $t_{118}$ and $t_{120}$ of the serial clock pulses.

In synchronism with a rising edge $t_{102}$ of the serial clock pulse which is inputted from the serial clock line 321 through the serial clock terminal 314, the second serial data processor 210 shifts and inputs the serial data of one bit on the serial data line 320 to the shift register 311 through the serial data terminal 313. The serial receiver 210 uninterruptedly shifts and inputs the serial data on the serial data line 320 to the shift register 311 sequentially in synchronism with rising edges $t_{104}$, $t_{106}$, $t_{108}$, $t_{110}$, $t_{112}$, $t_{114}$ and $t_{116}$ of the serial clock pulses. When the reception of the serial data of eight bits is ended at the final timing $t_{116}$, the data processing unit 316 reads out the content of the shift register 311 for necessary data processings via the internal data bus 315.

When the data processings necessary for the received data are ended, the data processing unit 316 writes the level "1" in the ACK trigger flag 369 via the internal data bus 316 in synchronism with a timing $t_{200}$. In synchronism with a subsequent timing $t_{201}$, the ACK output circuit 366 controls the ACK output driver 388 for the period of one serial clock pulse and outputs the L-level signal as the reception confirmation signal to the serial data line 320. If, in this case, the data line 320 is pulled up to the power source through a (not-shown) resistor, the open-drain transistor of the line driver 268 may be turned on to drop the potential of the data line 320 to the GND level.

The ACK detector 255 in the first serial data 200 processor sets the ACK detection flag 257, if it confirms that the serial data line 320 takes the L level at the timing of a rising edge $t_{202}$ of the serial clock pulse so that the confirmation signal has been outputted from the serial receiver 210. In synchronism with the timing of a rising edge $t_{203}$ of the subsequent serial clock pulse, the serial clock control 302 interrupts generation of the serial clock pulses. Simultaneously with this, the data processing unit 306 confirms that the ACK detection flag 257 has been set, and ends the sending and receiving actions of the serial data of one byte, while judging that all the processings of the data receptions at the serial data processor 210 have been completed.

The sending and receiving actions of the serial data are started again if the data processing unit 306 of the first serial data processor 200 transfers the subsequent send data to the shift register 301.

Let it be considered that the reception confirmation signal is not outputted from the second serial data processor 210 even after a predetermined time period T2 has elapsed. In this case, the first serial data processor 200 can interrupt its action to send the remaining serial data, judging that a malfunction has occurred in the second serial data processor 210, by administering the time of the confirmation signal at its data processing unit 306. In case data of plural bytes are to be transferred, more specifically, the data processing unit 316 of the second serial data processor 210 may be disabled from receiving the remaining data after it has received data of several bytes by an emergency factor other than the serial reception and may have to interrupt the continuous receiving action. In this emergency, the data processing unit 316 can inform the first serial data processor 200 of the interruption of the sending action of the serial data by holding the output of the confirmation signal.

Figure 4B:
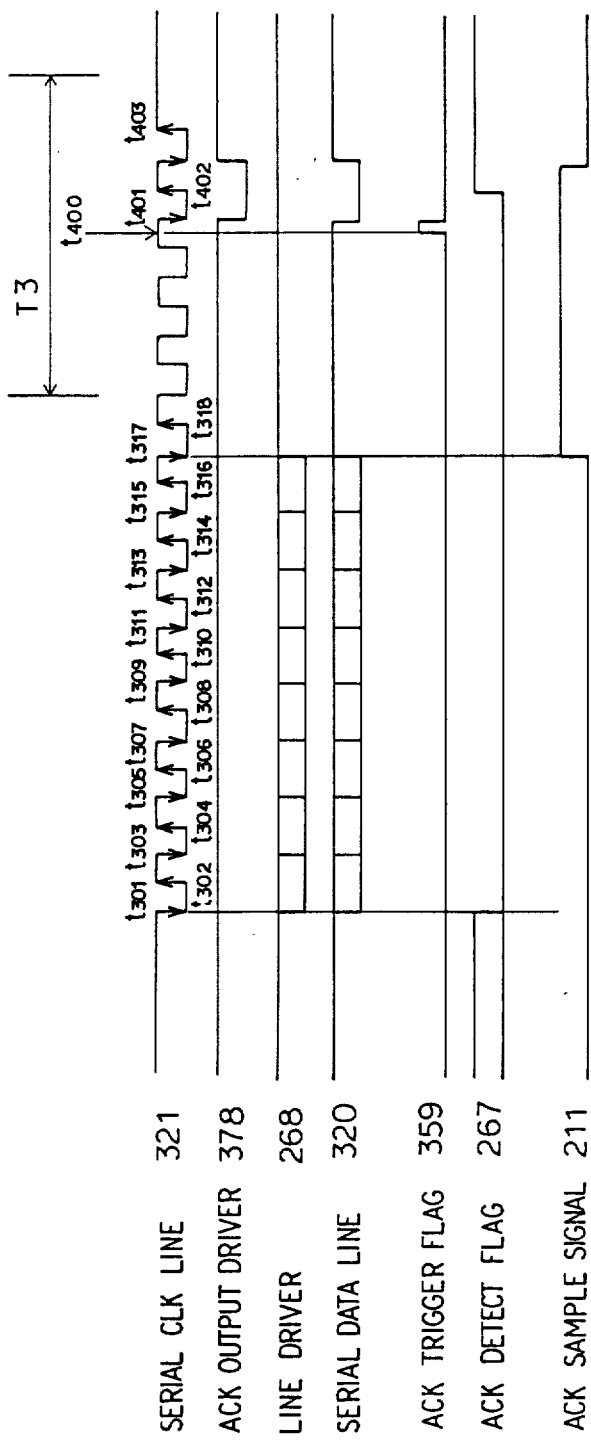

With reference to FIG. 4B, the synchronizations between the serial data on the serial data line 320 and the serial clock pulses on the serial clock line 321 will be described in case data of eight bits are to be continuously transferred from the second serial data processor 210 to the first serial data processor 200. It is also assumed that the first serial data processor 200 acts as the master whereas the second serial data processor 210 acts as the slave. The serial clock line 321 is held at the high level while no data is being transferred.

The serial clock generator 302 of the first serial data processor 200 starts generation of the serial clock pulses at a timing $t_{301}$ to send out them to the serial clock line 321. The serial clock pulses on the serial clock line 321 are inputted to the serial clock control 261 through the serial clock terminal 314.

In synchronism with the breaking edge $t_{301}$ of the serial clock pulse generated from the serial clock control 261, the shift register 311 of the second serial data processor 210 shifts one bit and outputs the data of one bit at its final stage to the serial data line 320 through the line driver 268 and the serial data output terminal 313. In synchronism with the individual timings of breaking edges $t_{303}$, $t_{305}$, $t_{307}$, $t_{309}$, $t_{311}$, $t_{313}$ and $t_{315}$ of the serial clock pulses, the shift register 311 uninterruptedly repeats its shifting actions and sends out the one bit at its final stage sequentially to the serial data line 320. When the serial data of eight bits are sent out in synchronism with the timing $t_{315}$, the ACK detector 265 pulls up the line driver 268 in synchronism with the timing of a breaking edge $t_{317}$ of the subsequent serial clock pulse. This raises the potential of the serial data line 320 to the high level.

The serial clock control 251 of the second serial data processor 210 activates the ACK sampling signal 211 in synchronism with the timing $t_{317}$.

The serial clock control 251 of the first serial data processor 200 uninterruptedly outputs the serial clock pulses, and the ACK detector 265 of the second serial data processor 210 starts sensing the L-level signal, which is outputted as the reception confirmation signal from the first serial data processor 200 to the serial data line 320, in synchronism with rising edges $t_{318}$ and $t_{320}$ of the serial clock pulses.

In synchronism with a rising edge $t_{302}$ of the serial clock pulse outputted from the serial clock control 251, the first serial data processor 200 shifts and inputs the serial data of one bit on the serial data line 320 to the shift register 301 through the serial data terminal 303. The first serial data processor 200 uninterruptedly shifts and inputs the serial data on the serial data line 320 to the shift register 301 sequentially in synchronism with rising edges $t_{304}$, $t_{306}$, $t_{308}$, $t_{310}$, $t_{312}$, $t_{314}$ and $t_{316}$ of the serial clock pulses. When the reception of serial data of eight bits is ended at the final timing $t_{316}$, the data processing unit 306 reads out the content of the shift register 301 for necessary data processings via the internal data bus 305. After the end of these data processings necessary for the received data, the data processing unit 306 writes the level "1" in the ACK trigger flag 359 via the internal data bus 306 in synchronism with a timing $t_{400}$. In synchronism with a subsequent timing $t_{401}$, the ACK output circuit 356 controls the ACK output driver 378 for one serial clock pulse and outputs the low-level signal as the reception confirmation signal to the serial data line 320.

The ACK detector 267 in the second serial data processor 210 sets the ACK detection flag 267, if it confirms that the serial data line 320 drops to the L level at the timing of a rising edge $t_{402}$ of the serial clock pulse and accordingly that the reception confirmation signal has been outputted from the first serial data processor 200.

In synchronism with the timing of a rising edge $t_{403}$ of the subsequent serial clock pulse, the serial clock control 251 stops generation of the serial clock pulses. Simultaneously with this, the data processing unit 316 confirms that the ACK detection flag 367 has been set, and ends the sending and receiving actions of the serial data of one byte, while judging that all the processings of the data receptions at the serial data processor 200 have been completed.

The sending and receiving actions of the serial data are started again if the first serial data processor 200 outputs the serial clock pulses.

Let it be considered that the reception confirmation signal is not issued from the first serial data processor 200 even after a predetermined time period T3 has elapsed. In this case, the first serial data processor 210 can interrupt its action to send the remaining serial data, interpreting that a multifunction has occurred in the first serial data processor 200, by administering the time of the confirmation signal at its data processing unit 316. In case data of plural bytes are to be transferred, more specifically, the data processing unit 306 of the first serial data processor 200 may be disabled from receiving the remaining data after it has received data of several bytes by an emergency factor other than the serial reception and may have to interrupt the continuous receiving action. In this emergency, the data processing unit 306 can inform the first serial data processor 210 of the interruption of the sending action of the serial data by holding the output of the confirmation signal.

As has been described hereinbefore, the serial data transfer system according to the present invention can confirm the data transfer at the sending and receiving sides through only the two lines, i.e., the serial data line and the serial clock line.

Since, moreover, the reception confirmation signal can be generated at an arbitrary timing after reception of predetermined data, the rate of the serial clock pulses can be raised. On the other hand, in case the serial data line 320 and the serial clock line 321 are connected with a number of serial data processors in addition to the first and second serial data processors, the period of the serial clock pulses, i.e., the transfer rate of the serial data need not be set to match the serial data processor having the lowest data processing ability for the reception confirmation at the receiving side, but the serial clock pulses of an optimum short period can be used for the serial data processor capable of serial data transfer of high rate so that the efficiency of the serial data transfer can be maximized. Since the output circuit and detector for the confirmation signal can be realized with a small quantity of hardware, still moreover, the serial data transfer system of the present invention can find its useful application as an inter-LSI serial data processing system.

Other embodiments of the present invention will be described with reference to FIGS. 5 to 9.

Figure 5:
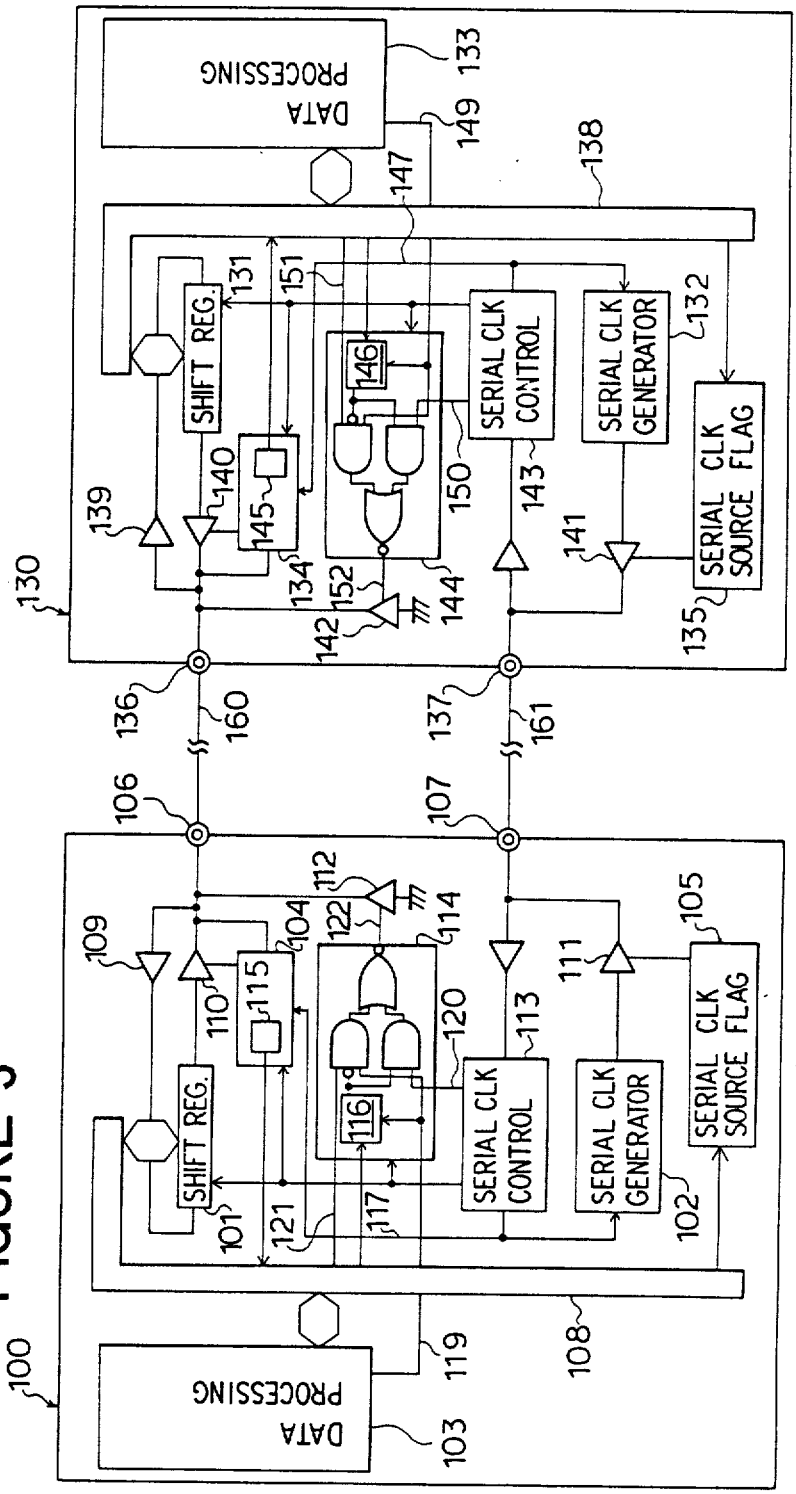
FIG. 5 is also a block diagram but shows a serial data transfer system according to a third embodiment of the present invention.

FIG. 5 is a block diagram showing a serial data transfer system according to a third embodiment of the present invention. A first serial data processor 100 is composed of a shift register 101, a serial clock generator 102, a data processing unit 103, a serial clock source flag 105, a serial data terminal 106, a serial clock terminal 107, an internal data bus 108, a line buffer 109, a line driver 110, a serial clock control 113, a reception confirmation signal (which will be shortly referred to as "ACK") detector 104, an ACK output circuit 114, a clock driver 111, an ACK detection flag 115, an ACK output selection flag 116, and an ACK output driver 112. Of these components, the shift register 101, the serial clock generator 102, the data processing unit 103, the serial clock source flag 105, the serial data terminal 106, the serial clock terminal 107, the internal data bus 108 and the line buffer 109 have the same functions as those of the system shown in FIG. 10, and their detailed descriptions will be omitted here. Therefore, the following description is directed to the functions of the remaining components.

The serial clock control 113 outputs an ACK sampling signal 117. This ACK sampling signal 177 is activated, after data of a predetermined length have been received, to designate the ACK detector 104 for the sampling signal of the reception confirmation signal. According to this embodiment, the ACK output circuit 114 is equipped with the ACK output selection flag 116.

This ACK output selection flag 116 is programmed to be written with a level "0", in case the first serial data processor 100 is sufficed to receive data but is not required for error checks or other data processings after the reception. In case, on the contrary, these data processings are necessary at the data processing unit 103 after the reception, the ACK output selection flag 116 is programmed to be written with a level "1". If this ACK output selection flag 116 is at the level "1", the ACK output circuit 114 outputs a reception confirmation signal 122 when a reception signal 120 outputted from the serial clock control 113 takes the level "1". If the ACK output selection flag 116 is at the level "0", on the contrary, the ACK output circuit 114 outputs the reception confirmation signal 122 when a data processing end signal 121 takes the level "1" under the control of an ACK write signal 119 outputted from the data processing unit 103.

The ACK detector 104 is equipped with the ACK detection flag 115. This ACK detection flag 115 is set when it is confirmed that the reception confirmation signal has been outputted to a serial data line 160 under the control of the ACK sampling signal 117. The processing unit 103 can read out the content of the ACK detection flag 115 via the internal data bus 108 and clears the ACK detection flag 115 in synchronism with the start of the serial sending action. The line driver 110 is one for driving the serial data line 160 and is controlled by the ACK detector 104.

A second serial data processor 130 is also composed of a shift register 131, a serial clock generator 132, a data processing unit 133, a serial clock source flag 135, a serial data terminal 136, a serial clock terminal 137, an internal data bus 138, a line buffer 139, a line driver 140, a serial clock control 143, an ACK detector 134, an ACK output circuit 144, a clock driver 141, an ACK detection flag 145, an ACK output selection flag 146 and an ACK output driver 142. This construction and the functions of those components are identical to those of the first serial data processor 100, and their detailed descriptions will be omitted here.

Turning now to FIG. 8A, the synchronizations between the serial data on the serial data line 160 and the serial clock pulses on a serial clock line 161 will be described when data of eight bits are to be continuously transferred from the first serial data processor 100 to the second serial data processor 130, in case the ACK output selection flag 146 is at the level "1" and in case neither the error checks not the data processings are required.

In the present embodiment, the first serial data processor 100 has its serial clock source flag 105 set so that it acts as the source (i.e., the master) of the serial clock pulses, whereas the second serial data processor 130 has its serial clock source flag 135 cleared (or reset) so that it acts as the slave for sending and receiving the serial clock pulses inputted from the serial clock terminal 137.

The serial clock line 161 is held at the high level while no data is being transferred. If the data processing unit 103 transfers the send data at a timing $t_{100}$ to the shift register 101 via the internal data bus 108, the ACK detection flag 115 is cleared at the same timing $t_{100}$. The serial clock generator 102 starts generation of the serial clock pulses at a timing $t_{101}$ and sends out those clock pulses to the serial clock line 161 through the serial clock terminal 107.

In synchronism with the breaking edge $t_{101}$ of the serial clock generated from the serial clock control 113, the shift register 101 shifts one bit and sends out the one bit at its final stage from the serial data terminal 106 to the serial data line 160 through the line driver 110. In synchronism with breaking edges $t_{103}$, $t_{105}$, $t_{107}$, $t_{109}$, $t_{111}$, $t_{113}$ and $t_{115}$ of the serial clock pulses, the shift register 101 uninterruptedly repeats its shifting actions and sends out the bits, which are shifted at its final stage, sequentially from the serial data terminal 106 to the serial data line 160. When the serial data of eight bits (i.e., one byte) are sent out at the timing $t_{115}$, the ACK detector 104 raises the line driver 110 to the high level at a subsequent breaking timing $t_{117}$. At this timing $t_{117}$, the serial clock control 113 outputs the ACK sampling signal 117. Independently of this, the serial clock generator 102 continues the generation of the serial clock pulses. In synchronism with the timing of a rising edge $t_{118}$, the ACK detector 104 samples the serial data line 160 and starts detection of the low-level signal which is sent as the reception confirmation signal from the second serial data processor 130.

In synchronism with a rising edge $t_{102}$ of the serial clock pulse inputted from the serial clock line 161 through the serial clock terminal 137, the second serial data processor 130 shifts and inputs the first one-bit data on the serial data line 160 to the shift register 131 through the serial data terminal 136. In synchronism with timings $t_{104}$, $t_{106}$, $t_{108}$, $t_{110}$, $t_{112}$, $t_{114}$ and $t_{116}$, the second serial data processor 130 uninterruptedly shifts and inputs the data of individual bits, which are inputted via the serial data line 160, sequentially to the shift register 131. When the reception of serial data of eight bits (i.e., one byte) is completed at the timing of the rising edge $t_{116}$ of the shift clock pulse, the data processing unit 133 reads out to the internal data bus 138 the eight-bit data inputted to the shift register 131.

The serial clock control 143 inputs a reception end signal 150 to the ACK output circuit 144 at the timing $t_{116}$ at which the serial data of the eighth bit is received. At this time, the ACK output selection flag 146 is at the level "1". When the reception end signal 150 is inputted, the ACK output circuit 144 outputs the low-level signal, as the reception confirmation signal to the first serial data processor 100 at the transmitting side, independently of other signals at the timing of the subsequent breaking edge $t_{117}$ from the serial data terminal 136 to the serial data line 160 through the ACK output driver 142.

The ACK detector 104 of the first serial data processor 100 sets the ACK detection flag 115 if it samples the serial data line 160 at the timing of the rising edge $t_{118}$ of the serial clock pulse to detect the low-level signal sent out as the reception confirmation signal from the second serial data processor 130. The serial clock control 113 interrupts the output of the serial clock pulses at the timing of a subsequent rising edge $t_{120}$. If it is confirmed that the ACK detection flag 115 has been set from the ACK detector 104 via the internal data bus 108, the data processing unit 103 judges that the second serial data processor 130 has completed all the processings of the data reception, and ends the sending processing of the serial data of one byte. After this, the data processing unit 103 transfers subsequent send data to the shift register 101 to start the sending processing of the subsequent serial data.

The synchronizations between the serial data on the serial data line 160 and the serial clock pulses on the serial clock line 161 in case the eight-bit data are to be continuously transferred from the second serial data processor 130 to the first serial data processor 100 when the ACK output selection flag 116 is at the level "1" are identical to those in the case of the data transfer from the first serial data processor 100 to the second data processor 130, and their detailed descriptions will be omitted here.

Figure 8B:
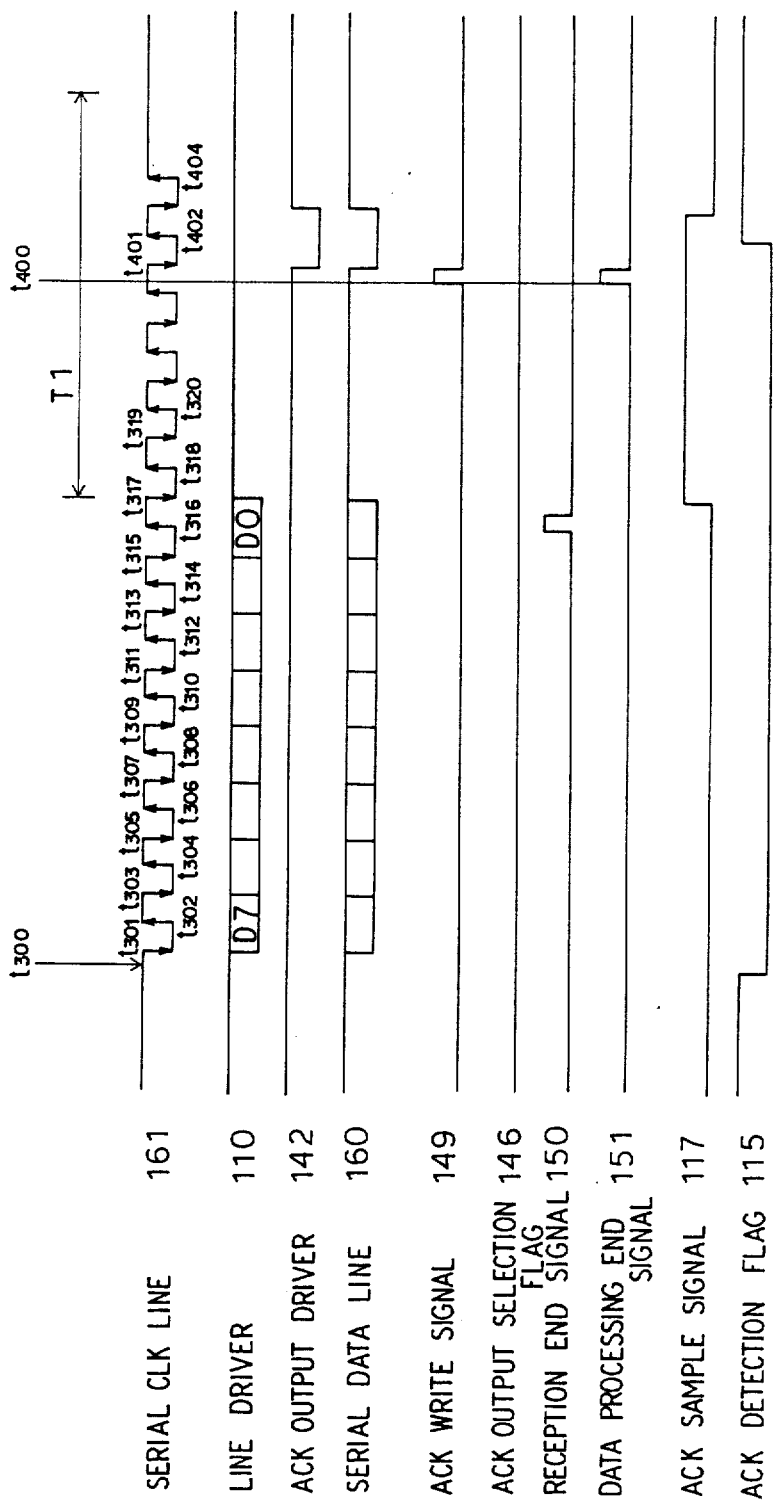

Turning to FIG. 8B, the synchronizations between the serial data on the serial data line 160 and the serial clock pulses on the serial clock line 161 when data of eight bits are to be continuously transferred from the first serial data processor 100 to the second serial data processor 130 will be described in the following in case the ACK output selection flag 146 is at the level "0" so that the error checks and the data processings are necessary after the data reception.

Let it be also assumed that the first serial data processor 100 is used as the master whereas the second serial data processor 130 is used as the slave.

If the data processing unit 103 transfers the send data at a timing $t_{300}$ to the shift register 101 via the internal data bus 108, the ACK detection flag 115 is cleared at the same timing $t_{300}$. The serial clock generator 102 starts generation of the serial clock pulses at a timing $t_{301}$ so that the clock pulses are sent from the serial clock terminal 107 to the serial clock line 161. In synchronism with the breaking edge $t_{301}$ of the serial clock generated from the serial control 113, the shift register 101 shifts one bit and sends out the bit of its final stage from the serial data terminal 106 to the serial data line 160 through the line driver 110. In synchronism with the individual timings of breaking edges $t_{303}$, $t_{305}$, $t_{307}$, $t_{309}$, $t_{311}$, $t_{313}$ and $t_{315}$ of the serial clock pulses, the shift register 101 uninterruptedly repeats its shifting actions to send out the bits, which are shifted at its final stages, sequentially to the serial data line 160.

When all the serial data of eight bits are sent out at the timing of the breaking edge $t_{315}$ of the serial clock, the ACK detector 104 raises the line driver 110 to the high level at the timing of a subsequent breaking edge $t_{317}$. At this timing $t_{317}$, the serial clock control 113 outputs the ACK sampling signal 117. Meanwhile, the serial clock generator 102 continues the generation of the serial clock pulses, and the ACK detector samples the serial data line 160 in synchronism with the individual timings of breaking edges $t_{318}$, $t_{320}$, . . . , and so on to detect the low-level signal being sent as the reception confirmation signal from the second serial data processor 130.

In synchronism with a rising edge $t_{302}$ inputted from the serial clock line 161 through the serial clock terminal 137, the second serial data processor 130 shifts and inputs the data of the first one bit from the serial data line 160 to the shift register 131 through the serial data terminal 136. In synchronism with individual timings $t_{304}$, $t_{306}$, $t_{308}$, $t_{310}$, $t_{312}$, $t_{314}$ and $t_{316}$, the second serial data processor 130 uninterruptedly shifts and inputs the data of the subsequent individual bits sequentially to the shift register 131. When the reception of the serial data of eight bits (i.e., one byte) is completed at the timing of the rising edge $t_{316}$ of the shift clock pulse, the data processing unit 133 reads out the data of eight bits for necessary processings, which have been inputted to the shift register 131, via the internal data bus 138.

At the timing $t_{316}$ of the serial data of the eighth bit, the serial clock control 143 sets the reception end signal 150 at the level "1" and inputs it to the ACK output circuit 144. Since, at this time, the ACK output selection flag 146 is at the level "0", the reception confirmation signal is not outputted.

If the necessary processings for the reception data are ended at the timing $t_{400}$, the data processing unit 133 outputs an ACK write signal 149 to the ACK output circuit 146. In synchronism with that signal 149, the end signal "1" outputted from the data processing unit 133 is inputted to the ACK output circuit 144 via the internal data bus 138 and a signal line 151. In synchronism with the timing of a subsequent breaking edge $t_{401}$, the ACK output circuit 144 outputs the low-level signal, as the reception confirmation signal to the first serial data processor 100 at the transmitting side, from the serial data terminal 136 to the serial data line 160 through the ACK output driver 142.

If the serial data line 160 takes the low level at the timing of a rising edge $t_{402}$ of the serial clock pulse, the ACK detector 104 confirms that the second serial data processor 130 has outputted the reception confirmation signal, and sets the ACK detection flag 115. Then, the serial clock control 113 interrupts the output of the serial clock pulses at the timing of a subsequent rising edge $t_{404}$. If it is confirmed that the ACK detection flag 115 has been set, the data processing unit 103 judges that all the processings of the data reception have been completed, and ends the sending action of the serial data of one byte. After this, the data processor 103 can reopen the sending action of subsequent serial data by setting the send data in the shift register 101.

Let it be considered that the reception confirmation signal is not outputted from the second serial data processor 130 even after lapse of a time period T1 after the ACK sampling signal 117 has been set. In this case, the first serial data processor 100 can interrupt its action to send the serial data therefrom, judging that a malfunction has occurred in the second serial data processor 130, by administering the time period continuing until the reception confirmation signal is returned.

The synchronizations between the serial data on the serial data line 160 and the serial clock pulses on the serial clock line 161 when eight-bit data are to be continuously transferred from the second serial data processor 130 to the first serial data processor 100 in case the ACK output selection flag 116 is at the level "0" are identical to those for the transfer from the first serial data processor 100 to the second serial data processor 130, and their detailed descriptions will be omitted here.

Figure 6:
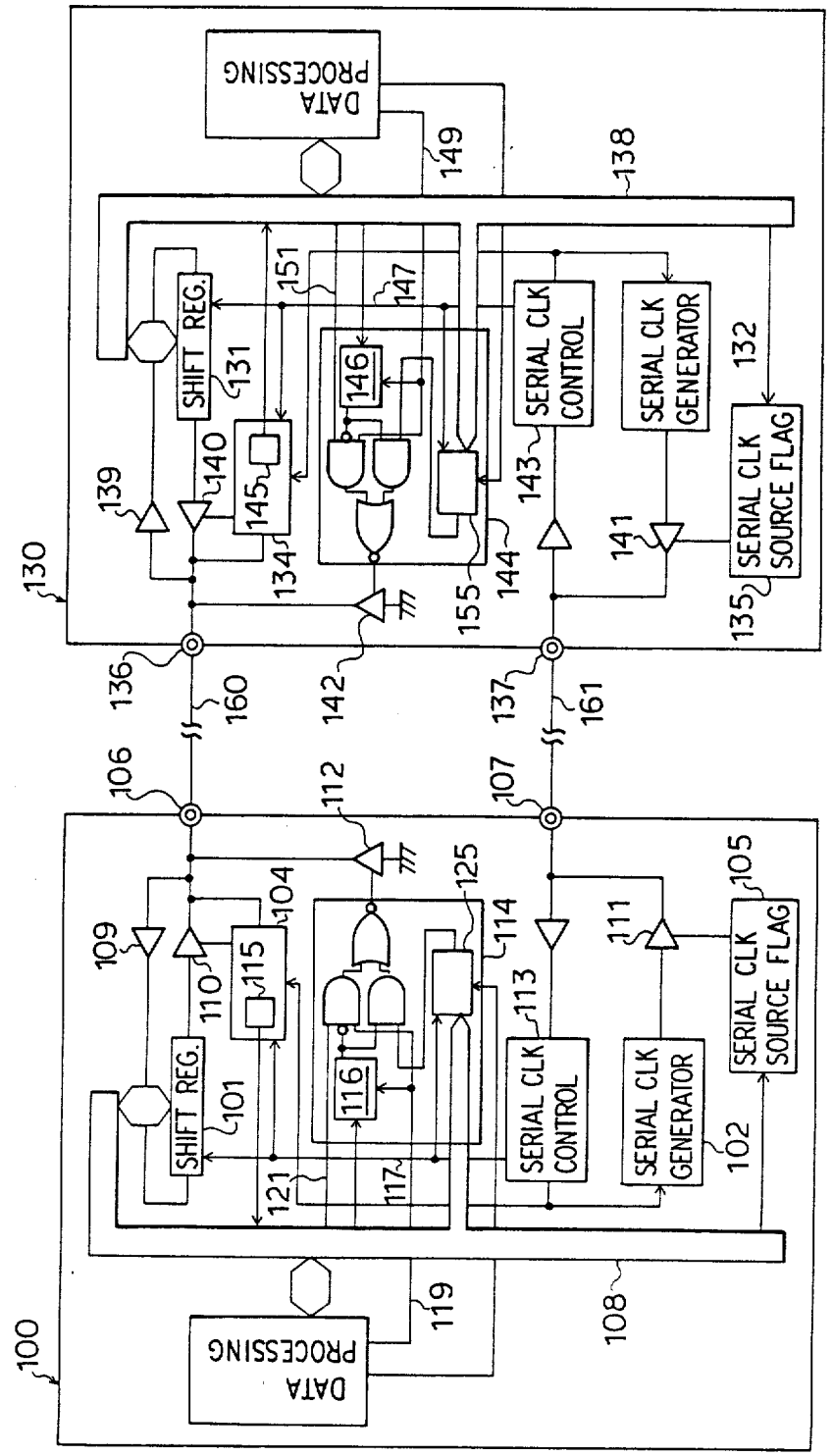
FIG. 6 is also a block diagram but shows a serial data transfer system according to a fourth embodiment of the present invention.

A fourth embodiment of the present invention will be described with reference to FIG. 6.

As shown, the first serial data processor 100 is also composed of the shift register 101, the serial clock generator 102, the data processing unit 103, the serial clock source flag 105, the serial data terminal 106, the serial clock terminal 107, the internal data bus 108, the line buffer 109, the line driver 110, the serial clock control 113, the ACK detector 104, the ACK output circuit 114, the clock driver 111 and the ACK output driver 112. The functions of these components other than that of the ACK output circuit 114 are identical to those of the third embodiment, and their detailed descriptions will be omitted here.

Figure 7A:
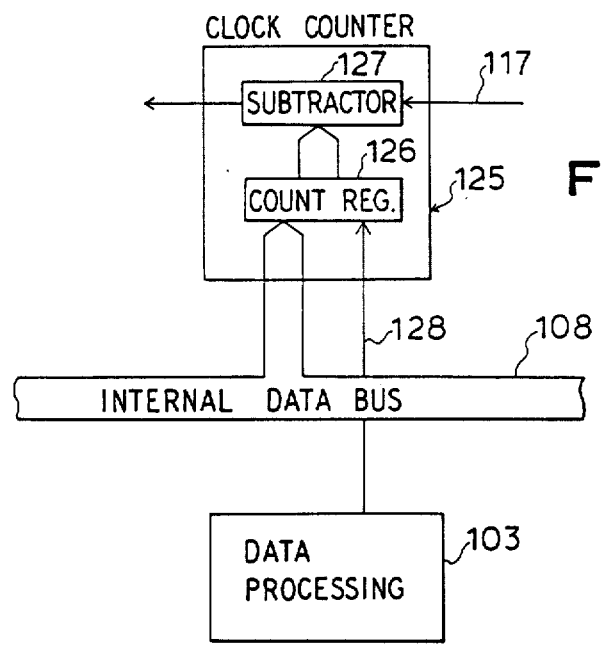
FIGS. 7A and 7B are also block diagrams but show a serial clock counter and its periphery of the serial data transfer system of FIG. 6.

The ACK output circuit 114 is equipped with a serial clock counter 125 in addition to the ACK output selection flag 116. As shown in FIG. 7A, the serial clock counter 125 is composed of a substracter 127 and a count register 126. In synchronism with a control signal 128, the count register 126 stores timing information n for outputting the reception confirmation signal inputted from the data processing unit 103 via the internal data bus 108. When generation of the serial clock pulses is started, the substracter 127 decrements the count number n, which is stored in the count register 126, by "1" in synchronism with the breaking edges of the serial clock pulses. If this borrow occurs, the level "1" is outputted to the ACK generator in the ACK output circuit 114, and the low-level signal as the reception confirmation signal is outputted from the serial data terminal 106 to the serial data line 160 through the ACK output driver 112. Like the third embodiment, the ACK output selection flag 116 is set in advance at the level "0" or "1" by the program. The construction and functions of the second serial data processor 130 are identical to those of the first serial data processor 100, and their detailed descriptions will be omitted here.

Figure 9:
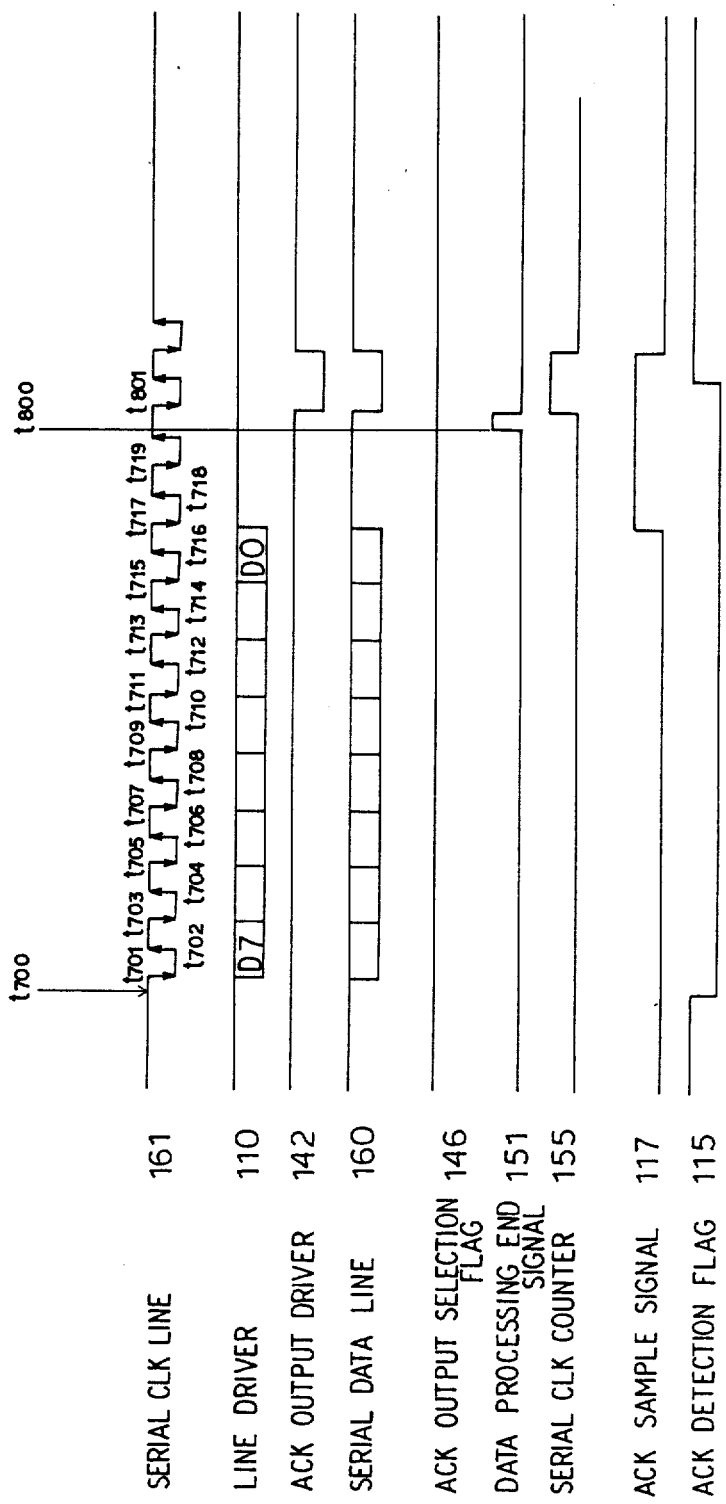
FIG. 9 is also a timing chart but shows the data transfer to be accomplished by the serial data transfer system of FIG. 6.

Next, the actions when the data of eight bits (i.e., one byte) are to be transferred from the first serial data processor 100 to the second serial data processor 130 will be described with reference to FIG. 9. The case, in which the ACK output selection flag is set at the level "0" by the program, is subjected to the same processings as those of the third embodiment, and its detailed description will be omitted here.

In case, on the other hand, the ACK output selection flag 146 is set at the level "1" by the program, the timings for outputting the reception confirmation signal can be arbitrarily selected at eighth, ninth, tenth shots and so on in accordance with the set value in a count register 156. In case the processings of the receive data are completed until a timing $t_{800}$, for example, the count register 156 may be set in advance at a value "9" so that the reception confirmation signal may be issued at the tenth shot.

Like the third embodiment, the first serial data processor 100 sends out data to the serial data line 160 in synchronism with the individual timings of breaking edges $t_{701}$, $t_{703}$, $t_{705}$, $t_{709}$, $t_{711}$, $t_{713}$ and $t_{715}$ of the serial clock pulses.

In synchronism with the individual timings of rising edges $t_{702}$, $t_{704}$, $t_{706}$, $t_{708}$, $t_{710}$, $t_{712}$, $t_{714}$ and $t_{716}$ of the serial clock pulses inputted from the serial clock line 161 through the serial clock terminal 137, on the other hand, the second serial data processor 130 sequentially shifts and inputs the serial data from the serial data line 160 to the shift register 131. When the reception of the eight-bit serial data is completed at the timing of the rising edge $t_{716}$ of the serial clock pulse, the data processing unit 133 reads out the eight-bit data from the shift register 131 to the internal data bus 138. At the timing of the first serial clock pulse $t_{701}$, moreover, the value of the count register 156 in a serial clock counter 155 is set in a subtracter 157. If it is now assumed that the subtracter 157 is set at the value "9", this value is decremented by "1" to a value "8" at the timing of the first breaking edge $t_{701}$. The value of the subtracter 157 is uninterruptedly decremented by "1" at each timing of the breaking edges so that the borrow occurs at a timing $t_{801}$. As a result, the value "1" is outputted from the subtracter 157, and the reception confirmation signal 152 is outputted from the ACK output circuit 144 in synchronism with the same timing $t_{801}$.

As has been described above, the serial data transfer system according to the fourth embodiment is advantageous in that it can appropriately change the time period for processing the receive data, because the output timing of the reception confirmation signal can be set at will. Another advantage is that the program for informing the ACK output circuit 144 of the end of the data processings from the data processing unit 133 can be dispensed with.

Incidentally, the subtracter may be set with a predetermined value by the use of hardware.

Figure 7B:
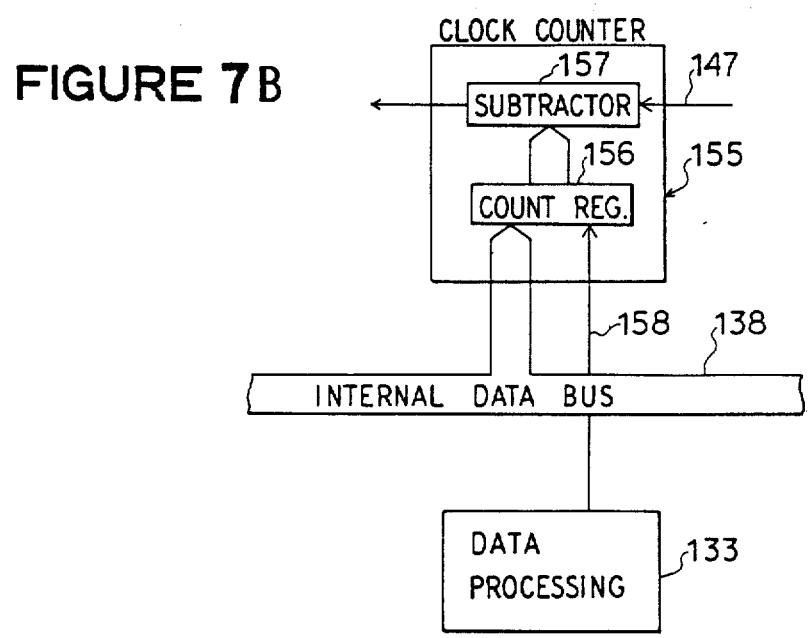

FIG. 7B is a block diagram showing the serial clock counter and its periphery in the second serial data processor 130, which are absolutely identical to those of FIG. 7A.

As has been described hereinbefore, the serial data transfer system according to the third and fourth embodiments of the present invention is advantageous in that the transmitting side can be informed of the end of reception because the reception confirmation signal is returned from the ACK output circuit to the transmitting side after the receive data have been processed. According to another advantage, if a malfunction occurs at the receiving side, the transmitting side can be informed of a rejection to the reception by prohibiting the reception confirmation signal from being sent out to the transmitting side for a constant time period.

Thanks to the provision of the ACK output selection flag, furthermore, it can be selected by the program whether the output of the reception confirmation signal be synchronized according to the receive data with the instant when the eight-bit serial data are received or when the necessary processings of the receive data at the data processing unit are completed. In the continuous high-rate serial data transfer of plural bytes, any software for informing the end of the data processings is not required so that the processing efficiency of the CPU can be drastically improved. Incidentally, it is apparent that the present invention can be applied to a high-rate serial transfer (e.g., the DMA transfer) using no data processing unit.

We claim:
1. A serial data transfer system comprising:
    a first serial data processor acting as a master;
    a second serial data processor acting as a slave;
    a data line connecting said first and second serial data processors for allowing serial data to be transferred therethrough between said first and second serial data processors; and
    a clock line connecting said first and second serial data processors, wherein each of said first and second serial data processors includes:
    serial clock generating means for outputting a serial clock onto said clock line so that said serial clock is transferred through said clock line between said first and second serial data processors;

reception confirmation signal output means including an acknowledge trigger flag for outputting a reception confirmation signal to said data line in response to a clock signal when said acknowledge trigger flag is set to a predetermined condition;

reception confirmation signal detection means including a reception confirmation signal detection flag for detecting said reception confirmation signal on said data line so as to set said reception confirmation signal detection flag to a predetermined condition;

serial clock control means coupled to receive said clock line to detect completion of transfer of a predetermined number of serial clock signals in order to detect completion of transfer of data composed of a predetermined number of bits, whereby said serial clock control means of said first serial data procossor responds to said detection of said completion of transfer of data to generate a reception confirmation signal sampling signal to send to said serial clock generating means and said reception confirmation signal detection means of said first serial data processor so that said serial clock generating means of said first serial data processor will successively generate said serial clock and output said serial clock to said second data processor until said reception confirmation signal detection flag is set, and at the same time said reception confirmation signal detection means of said first serial data processor starts an operation for detecting said reception confirmation signal on said data line; and said acknowledge trigger flag of said reception confirmation signal output means in said second serial data processor is set to said predetermined condition in response to completion of processing of said data composed of said predetermined number of bits received by said second data processor so that said reception confirmation signal output means of said second serial data processor outputs said reception confirmation signal in synchronism with said serial clock received after said processings for said received data such that said reception confirmation signal detection means detects said reception confirmation signal and sets said reception confirmation signal detection flag so that said serial clock generating means stops generation of said serial clock in response to the reception confirmation signal detection flag being set.

2. A serial data transfer system according to claim 1, wherein said reception confirmation signal detection means detects said reception confirmation signal for a predetermined sampling period.

3. A serial data transfer system according to claim 1, wherein each of said first and second serial data processors further includes:

a shift register having a serial data input/output connected to said data line for serially outputting data to be transferred onto said data line in synchronism with said serial clock and for serially receiving data on the data line in synchronism with said serial clock;

a serial clock source flag for changing one of said first and second serial data processors, to which it belongs, into said master when set, and into said slave when reset; and a data processing unit coupled through an internal bus to a parallel data input/output of said shift register for writing into said shift register data to be transferred and reading a received data to be transferred and reading a received data from said shift register, said data processing unit operating for setting and resetting said serial clock source flag through said internal bus.

4. A serial data transfer system comprising:

first and second serial data processors;

a data line connecting said first and second serial data processors for allowing serial data to be transferred therethrough between said first and second serial data processors;

a clock line connecting said first and second serial data processors, wherein each of said first and second serial data processors includes:

an output circuit for outputting a reception confirmation signal to said data line;

a circuit for generating a first signal indicating an end of reception of said serial data;

a circuit for generating a second signal indicating an end of processing of data received;

a circuit for controlling an output of said reception confirmation signal;

a reception confirmation signal detection circuit for detecting said reception confirmation signal on said data line, a reception confirmation detection flag set to a predetermined condition when said reception confirmation signal on said data line is detected by said reception confirmation signal detection circuit; and serial clock generating means for outputting a serial clock onto said clock line until said reception confirmation signal detection flag is set to said predetermined condition, so that said serial clock is transferred through said clock line between said first and second serial data processors; wherein, after reception of the serial data on said data line is ended, said output circuit of one of said first and second serial data processors, which functions as a receiver, outputs said reception confirmation signal to said data line in response to one of said first signal and said second signal, and after transmission of the serial data onto said data line is ended, said reception confirmation signal detection circuit of the other of said first and second serial data processors, which functions as a transmitter, is brought into a condition of detecting said reception confirmation signal on said data line for a predetermined period, and when said reception confirmation signal on said data line is detected, said reception confirmation signal detection flag is set to said predetermined condition and said serial clock generating means stops generation of said serial clock onto said clock line in response to the set reception confirmation signal detection flag.

5. A serial data transfer system according to claim 4, wherein each of said first and second serial data processors further includes:

a shift register having a serial data input/output connected to said data line for serially outputting data to be transferred onto said data line in synchronism with said serial clock and for serially receiving data on the data line in synchronism with said serial clock;

a serial clock generator for generating said serial clock onto said clock line so that said serial clock is transferred through said clock line between said first and second serial data processors;

a serial clock source flag for changing one of said first and second serial data processors, to which it belongs, into said master when set, and into said slave when reset; and a data processing unit coupled through an internal bus to a parallel data input/output of said shift register for writing into said shift register data to be transferred and reading a received data from said shift register, said data processing unit operating for setting and resetting said serial clock source flag through said internal bus.

6. A serial data transfer system according to claim 5, wherein each of said first and second serial data processors further includes a serial clock control for outputting a reception confirmation signal sampling signal for designating a sampling period of said reception confirmation signal to said output circuit, and wherein said output circuit includes a reception confirmation signal output selection flag for causing said output circuit to output said reception confirmation signal in response to either said first signal or said second signal which is designated by said reception confirmation signal output selection flag.

7. A serial data transfer system according to claim 6, wherein said output circuit further includes a serial clock counter having; a count register set with a timing setting value by said data processing unit; and a subtracter coupled to said count register for decrementing said timing setting value in response to each of said serial clock pulses.

8. A data processor comprising:

a shift register to be connected to a single serial data line for serially outputting data to be transferred onto said data line and for serially receiving data on said data line;

a data processing unit coupled through an internal bus to said shift register for writing into said shift register said data to be transferred and reading a received data from said shift register;

a serial clock generator for generating a serial clock;

a serial clock source flag set and reset by said data processing unit through said internal bus for indicating that the data processor functions as a master when said serial clock source flag is in a first condition and that the data processor functions as a slave when said serial clock source flag is in a second condition opposite to said first condition;

a clock driver having an input connected to receive said serial clock and an output to be connected to a single serial clock line, said clock driver being controlled by said serial clock source flag so as to output said serial clock onto said clock line when said serial clock source flag is in said first condition and to prevent said serial clock from being outputted onto said clock line when said serial clock source flag is in said second condition;

an acknowledge detector to be coupled to said data line and operating to stop an output of data from said shift register to said data line after data composed of a predetermined number of bits has been outputted onto said data line, said acknowledge detector including an acknowledge detection flag coupled to said data processing unit, said acknowledge detector also operating to detect an acknowledge signal on said data line so as to bring said acknowledge detection flag to a predetermined condition when said acknowledge signal on said data line is detected so that receipt of said acknowledge edge signal is informed to said data processing unit, and said acknowledge detection flag being cleared when data to be transferred is written to said shift register by said data processing unit;

an acknowledge signal output circuit including an acknowledge trigger flag which is brought to a predetermined condition by said data processing unit after said data processing unit has completed a predetermined processing of said received data read from said shift register, said acknowledge signal on circuit operating to output said acknowledge signal on said data line after said acknowledge trigger flag is set to said predetermined condition; and a serial clock control to be coupled to said clock line to receive said serial clock on said clock line for supplying said serial clock to said shift register so that data held in said shift register is shifted bit by bit in response to each serial clock, said serial clock control also outputting said serial clock to said acknowledge detector and said acknowledge signal output circuit, said serial clock control operating to detect appearance of a predetermined number of serial clocks on said clock line in order to detect completion of a transfer of data composed of said predetermined number of bits, wherein when said serial clock source flag is in said first condition, after said serial clock control detects the completion of said transfer of data, said serial clock control generates an acknowledge sampling signal having a predetermined active period longer than a period of each serial clock, to send to said serial clock generator and said acknowledge detector, so as to cause said serial clock generator to successively generate and output said serial clock and at the same time said acknowledge detector to perform an operation for detecting said acknowledge signal on said data line during said active period of said acknowledge sampling signal, such that when said acknowledge signal on said data line is detected by said acknowledge detector during said active period of said acknowledge sampling signal, said acknowledge detection flag is set to said predetermined condition in synchronism with said serial clock appearing after said detection of said acknowledge signal, and said serial clock control responds to the set acknowledge detection flag to cause said serial clock generator to stop output of said serial clock, and when said serial clock source flag is in said second condition, said acknowledge signal output circuit outputs said acknowledge signal in synchronism with said serial clock appearing after said acknowledge trigger flag is set to said predetermined condition.

9. A data processor according to claim 8, wherein each of said data line and said clock line is a pulled-up line so that said serial clock is transferred in a form of a negative-going pulse, and wherein after the transfer of data composed of said predetermined number of bits has been completed, said acknowledge detector operates to bring said data line to a pulled-up condition so as to stop said output of data from said shift register so that said acknowledge signal can be transferred in the form of a negative-going pulse.

10. A data processor according to claim 9, wherein said shift register operates to output data onto said data line bit by bit in response to a falling edge of each serial clock, and to receive data on said data line in response to a rising edge of each serial clock, and said acknowledge detector operates to detect said acknowledge signal on said data line in synchronism with a rising edge of each serial clock.

11. A data processor according to claim 10, wherein when said acknowledge signal on said data line is not detected by said acknowledge detector during said active period of said acknowledge sampling signal, said data processing unit stops data transmission of the data processor.

12. A data processor comprising:
- a shift register to be connected to a single serial data line for serially outputting data to be transferred onto said data line and for serially receiving data on said data line;
- a data processing unit coupled through an internal bus to said shift register for writing said shift register with said data to be transferred and reading a received data from said shift register, said data processing unit generating an active data processing end signal when said data processing unit has completed a predetermined processing on said receive data read from said shift register;
- a serial clock generator for generating a serial clock;
- a serial clock source flag set and reset by said data processing unit through said internal bus for indicating that the data processor functions as a master when said serial clock source flag is in a first condition and that the data processor functions as a slave when said serial clock source flag is in a second condition opposite to said first condition;
- a clock driver having an input connected to receive said serial clock and an output to be connected to a single serial clock line, said clock driver being controlled by said serial clock source flag so as to output said serial clock onto said clock line when said serial clock source flag is in said first condition and to prevent said serial clock from being outputted onto said clock line when said serial clock source flag is in said second condition;
- an acknowledge detector to be coupled to said data line and operating to stop an output of data from said shift register to said data line after data composed of a predetermined number of bits has been outputted onto said data line, said acknowledge detector including an acknowledge detection flag coupled to said data processing unit, said acknowledge detector also operating to detect an acknowledge signal on said data line so as to bring said acknowledge detection flag to a predetermined condition when said acknowledge sign on said data line is detected so that receipt of said acknowledge signal is informed to said data processing unit, and said acknowledge detection flag being cleared when data to be transferred is written to said shift register by said data processing unit;
- an acknowledge signal output circuit including an acknowledge output selection flag which is controlled by said data processing unit to be brought to a first condition when said data processing unit performs said predetermined processing on said received data read from said shift register and to a second condition when said data processing unit does not perform any processing on said received data read from said shift register, said acknowledge signal output circuit having a first signal input receiving said data processing end signal from said data processing and a second signal input so that said acknowledge signal output circuit operates to output said acknowledge signal on said data line in response to one of said first and second signal inputs selected in accordance with a condition of said acknowledge output selection flag;
- a serial clock control to be coupled to said clock line to receive said serial clock on said clock line for supplying said serial clock to said shift register so that data held in said shift register is shifted bit by bit in response to each serial clock, said serial clock control also outputting said serial clock to said acknowledge detector and said acknowledge signal output circuit, said serial clock control operating to detect appearance of a predetermined number of serial clocks on said clock line in order to generate an acknowledge sampling signal having a predetermined active period longer than a period of each serial clock in response to completion of a transfer of data composed of said predetermined number of bits in the case that said serial clock source flag is in said first condition and in order to generate an active reception end signal to said second signal input of said acknowledge signal output circuit in response to completion of a receipt of data composed of said predetermined number of bits when said serial clock source flag is in said second condition, wherein when said serial clock source flag is in said first condition after said serial clock control detects the completion of said transfer of data, said serial clock control outputs said acknowledge sampling signal to said serial clock generator and said acknowledge detector, so as to cause said serial clock generator to successively generate and output said serial clock and at the same time said acknowledge to perform an operation for detecting said acknowledge signal on said data line during said active period of said acknowledge sampling signal, such that when said acknowledge signal on said data line is detected by said acknowledge detector during said active period of said acknowledge sampling signal, said acknowledge detection flag is set to said predetermined condition in synchronism with said serial clock appearing after said detection of said acknowledge signal, and said serial clock control responds to the set acknowledge detection flag to cause said serial clock generator to stop output of said serial clock and makes said acknowledge sampling signal inactive, and when said serial clock source flag is in said second condition, when said acknowledge output selection flag is in said first condition, said acknowledge signal output circuit outputs said acknowledge signal in synchronism with said serial clock appearing after said reception end signal has been activated and when said acknowledge output selection flag is in said second condition, said acknowledge signal output circuit outputs said acknowledge signal in synchronism with said serial clock appearing after said data processing end signal has been activated.

13. A data processor according to claim 12, wherein each of said data line and said clock line is a pulled-up line so that said serial clock is transferred in a form of a negative-going pulse, and wherein after the transfer of data composed of said predetermined number of bits has been completed, said acknowledge detector operates to bring said data line to a pulled-up condition so as to stop said output of data from said shift register so that said acknowledge signal can be transferred in the form of a negative-going pulse.

14. A data processor according to claim 13, wherein said shift register operates to output data onto said data line bit by bit in response to falling edge of each serial clock, and to receive data on said data line in response to a rising edge of each serial clock, and said acknowledge detector operates to detect said acknowledge signal on said data line in synchronism with a rising edge of each serial clock and said serial clock control generates said reception end signal in synchronism with a rising edge of said serial clock.

15. A data processor according to claim 14, wherein when said acknowledge signal on said data line is not detected by said acknowledge detector during said active period of said acknowledge sampling signal, said data processing unit stops data transmission of the data processor.

16. A data processor comprising:
  a shift register to be connected to a single serial data line for serially outputting data to be transferred onto said data line and for serially receiving data on said data line;
  a data processing unit coupled through an internal bus to said shift register for writing said shift register with said data to be transferred and reading a received data from said shift register, said data processing unit generating an active data processing end signal when said data processing unit has completed a predetermined processing on said receive data read from said shift register;
  a serial clock generator for generating a serial clock;
  a serial clock source flag set and reset by said data processing unit through said internal bus for indicating that the data processor functions as a master when said serial clock source flag is in a first condition and that the data processor functions as a slave when said serial clock source flag is in a second condition opposite to said first condition;
  a clock driver having an input connected to receive said serial clock and an output to be connected to a single serial clock line, said clock driver being controlled by said serial clock source flag so as to output said serial clock onto said clock line when said serial clock source flag is in said first condition and to prevent said serial clock from being outputted onto said clock line when said serial clock source flag is in said second condition;
  an acknowledge detector to be coupled to said data line and operating to stop an output of data from said shift register to said data line after data composed of a predetermined number of bits has been outputted onto said data line, said acknowledge detector including an acknowledge detection flag coupled to said data processing unit, said acknowledge detector also operating to detect an acknowledge signal on said data line so as to bring said acknowledge detection flag to a predetermined condition when said acknowledge signal on said data line is detected so that receipt of said acknowledge signal is informed to said data processing unit, and said acknowledge detection flag being cleared when data to be transferred is written to said shift register by said data processing unit;
  an acknowledge signal output circuit including an acknowledge output selection flag which is controlled by said data processing unit to be brought to a first condition when said data processing unit performs said predetermined processing on said received data read from said shift register and to a second condition when said data processing unit does not perform any processing on said received data read from said shift register, said acknowledge signal output circuit also including a serial clock counter preset by said data processing unit and decremented in response to each serial clock so as to generate a borrow signal when a count value of said clock counter becomes less than zero, said acknowledge signal output circuit receiving said data processing end signal from said data processing unit and operating to output said acknowledge signal on said data line in response to one of said data processing end signal and said borrow signal selected in accordance with a condition of said acknowledge output selection flag;
  a serial clock control to be coupled to said clock line to receive said serial clock on said clock line for supplying said serial clock to said shift register so that data held in said shift register is shifted bit by bit in response to each serial clock, said serial clock control also outputting said serial clock to said acknowledge detector and said acknowledge signal output circuit, said serial clock control operating to detect appearance of a predetermined number of serial clocks on said clock line in order to generate an acknowledge sampling signal having a predetermined active period longer than a period of each serial clock in response to completion of a transfer of data composed of said predetermined number of bits when said serial clock source flag is in said first condition, wherein
  when said serial clock source flag is in said first condition, after said serial clock control detects the completion of said transfer of data, said serial clock control outputs said acknowledge sampling signal to said serial clock generator and said acknowledge, so as to cause said serial clock generator to successively generate and output said serial clock and at the same time said acknowledge detector to perform an operation for detecting said acknowledge signal on said data line during said active period of said acknowledge sampling signal, such that when said acknowledge signal on said data line is detected by said acknowledge detector during said active period of said acknowledge sampling signal, said acknowledge detection flag is set to said predetermined condition in synchronism with said serial clock appearing after said detection of said acknowledge signal, and said serial clock control responds to the set acknowledge detection flag to cause said serial clock generator to stop output of said serial clock and makes said acknowledge sampling signal inactive, and
  when said serial clock source flag is in said second condition, when said acknowledge output selection flag is in said first condition, said acknowledge signal output circuit outputs said acknowledge signal in synchronism with said serial clock appearing after said reception end signal has been activated, and when said acknowledge output selection flag is in said second condition, said acknowledge signal output circuit outputs said acknowledge signal in synchronism with said serial clock appearing after said borrow signal has been outputted.

17. A data processor according to claim 16, wherein said serial clock counter includes a count register set with a timing setting value by said data processing unit, and a subtracter coupled to said count register for decrementing said timing setting value in response to each serial clock.

* * * * *